(12) United States Patent
Ito

(10) Patent No.: US 7,229,134 B2
(45) Date of Patent: Jun. 12, 2007

(54) SEAT APPARATUS FOR VEHICLE

(75) Inventor: Sadao Ito, Anjo (JP)

(73) Assignee: Aisin Seiki Kabushiki Kasiha, Kariya-shi, Aichi (JP)

( * ) Notice: Subject to any disclaimer, the term of this patent is extended or adjusted under 35 U.S.C. 154(b) by 59 days.

(21) Appl. No.: 10/892,324

(22) Filed: Jul. 16, 2004

(65) Prior Publication Data

US 2005/0012377 A1    Jan. 20, 2005

(30) Foreign Application Priority Data

Jul. 16, 2003  (JP) ............................ 2003-198001

(51) Int. Cl.
*A47C 20/00* (2006.01)
(52) U.S. Cl. .................... 297/423.26; 297/423.28; 297/423.3; 297/69
(58) Field of Classification Search .......... 297/423.26, 297/423.28, 423.29, 423.3, 68, 69
See application file for complete search history.

(56) References Cited

U.S. PATENT DOCUMENTS

| | | | | |
|---|---|---|---|---|
| 24,511 A | * | 6/1859 | Wagner et al. ................ | 297/69 |
| 27,645 A | * | 3/1860 | McGregor .................... | 297/68 |
| 375,448 A | * | 12/1887 | Hayward ................ | 297/423.28 |
| 2,834,397 A | * | 5/1958 | Kluglein et al. .............. | 297/68 |
| 3,696,683 A | | 10/1972 | Jensen | |
| 4,678,229 A | * | 7/1987 | Ryan et al. .................... | 297/68 |
| 5,362,128 A | * | 11/1994 | Wildern, IV ........... | 297/284.11 |
| 5,507,562 A | | 4/1996 | Wieland | |
| 5,588,707 A | | 12/1996 | Bolsworth et al. | |
| 6,095,610 A | | 8/2000 | Okajima et al. ....... | 297/423.36 |
| 6,454,353 B1 | * | 9/2002 | Knaus .................... | 297/284.11 |
| 6,959,966 B2 | * | 11/2005 | Kristen ................... | 297/423.26 |

FOREIGN PATENT DOCUMENTS

| | | |
|---|---|---|
| JP | 2001-70074 | 3/2001 |
| JP | 2001-114007 | 4/2001 |

* cited by examiner

*Primary Examiner*—Laurie K. Cranmer
(74) *Attorney, Agent, or Firm*—Finnegan, Henderson, Farabow, Garrett & Dunner, LLP

(57) ABSTRACT

A seat apparatus for a vehicle includes supporting member and a moving member whose position is adjustable relative to the supporting member while a posture of the moving member is in a predetermined posture comprising a link member rotatably connected to the supporting member and the moving member respectively, a first gear secured to the moving member, a second gear secured to the supporting member and a transmitting gear rotatably supported to the link member. The transmitting gear includes a first partial gear meshing with the first gear and a second partial gear meshing with the second gear.

6 Claims, 7 Drawing Sheets

SEAT APPARATUS FOR VEHICLE

CROSS REFERENCE TO RELATED APPLICATIONS

This application is based on and claims priority under 35 U.S.C. § 119 to Japanese Patent Application 2003-198001, filed on Jul. 16, 2003, the entire content of which is incorporated herein by reference.

FIELD OF THE INVENTION

This invention generally relates to a seat apparatus including a link mechanism for changing a position of a part of the seat or folding a part of the seat, for example, a seat cushion, a leg portion, a footrest or a seat back. More particularly, the present invention pertains to a seat apparatus including a link mechanism for sufficiently changing the position of the part.

BACKGROUND

As an example of a device for sufficiently changing a position of a predetermined part of the seat, a known seat apparatus is disclosed in U.S. Pat. No. 6,095,610. The disclosed seat apparatus includes a link mechanism for changing a position of a footrest relative to the seat cushion. Such link mechanism basically includes a known four joint linkage having four links provided in a rectangle and rotation shafts for connecting the links. The four joint linkage applied to the part which is sufficiently changed also includes plural auxiliary links for securing the strength of the link mechanism enough to support a load applied to the footrest even if an angle between the links becomes equal to or more than a predetermined angle.

A structure of the link mechanism having aforementioned configuration is complicated because many links and rotation shafts connecting the links are provided thereto. In addition, relatively large and heavy links and rotation shafts need to be provided to such link mechanism applied to a vehicle seat apparatus to secure enough strength for supporting excessive load applied to the seat.

A need exists for a seat apparatus to include a link mechanism being light in weight and having few links.

SUMMARY OF THE INVENTION

According to an aspect of the present invention, A seat apparatus for a vehicle includes supporting member and a moving member whose position is adjustable relative to the supporting member while a posture of the moving member is in a predetermined posture comprising a link member rotatably connected to the supporting member and the moving member respectively, a first gear secured to the moving member, a second gear secured to the supporting member and a transmitting gear rotatably supported to the link member. The transmitting gear includes a first partial gear meshing with the first gear and a second partial gear meshing with the second gear.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention are explained referring to attached drawings FIG. 1 through FIG. 7. A first embodiment of the present invention shown in FIG. 4 relates to the seat apparatus 1 including a collapsible footrest 4. The seat apparatus 1 also includes a seat back 2 and a seat cushion 3.

Figure 1:
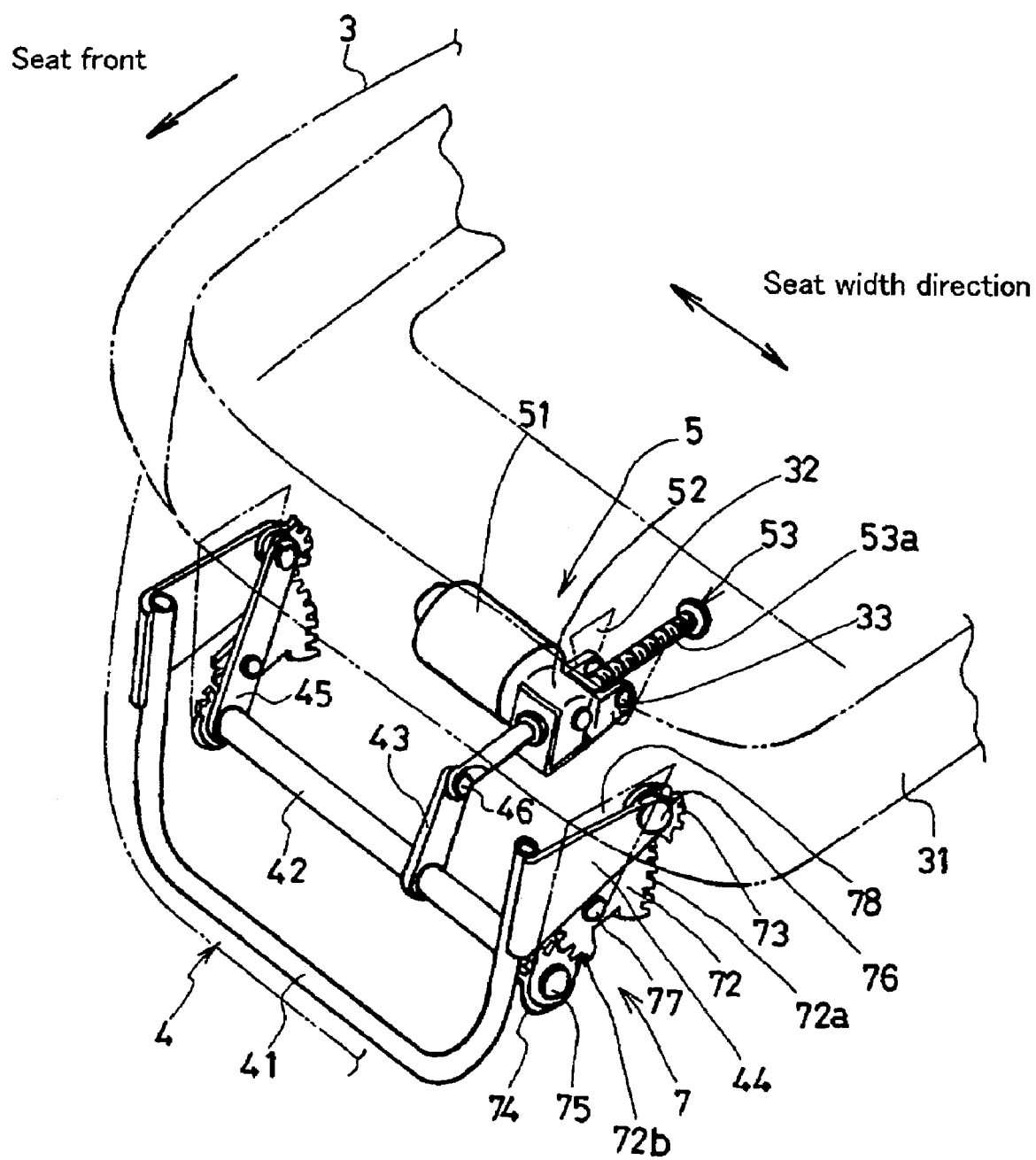
FIG. 1 illustrates a perspective view of a seat apparatus according to the first embodiment of the present invention.

As shown in FIG. 1, the seat cushion 3 includes a cushion frame 31 as a structural member for enhancing the strength of the seat cushion 3. Further, a pair of brackets 78 is provided at an under surface of the front end of the cushion frame 31. The brackets 78 are spaced in a seat width direction.

The footrest 4 including a link mechanism 7 as a main subject of the present invention is supported to the bracket 78. The footrest 4 also includes a pair of arms 44 spaced in the seat width direction, and a U-shaped supporting member 41 extending in the seat width direction. The each end of the supporting member 41 is supported to the each arm 44. In such configuration, the footrest 4 is freely folded or unfolded relative to the seat cushion 3 by the link mechanism 7.

One end of a link member 45 being long shaped is connected to each arm 44 with a supporting shaft 76 which is secured to each arm 44. The other end of the link member 45 is connected to each bracket 78 with a rotation shaft 75 which is rotatably supported on each bracket 78. A transmitting gear 72 is rotatably attached to the link member 45 with a rotation shaft 75. The transmitting gear 72 is shaped in a link shape. The transmitting gear 72 includes a first partial gear 72a and a second partial gear 72b facing each other relative to the rotation shaft 77.

The transmitting gear 72 includes the first partial gear 72a and the second partial gear 72b at both ends thereof. Ranges of the teeth of respective first partial gear 72a and the second partial gear 72b correspond to a rotation angle of the transmitting gear 72. The transmitting gear 72 is a long and narrow width shape so that the link mechanism 7 can be provided within a narrow space. Further, the characteristic of the actuation of the link mechanism 7 can be changed by changing a pitch circle diameter and the number of teeth of each first partial gear 72a and second partial gear 72b so as to be easily adapted to many applications.

Figure 2:
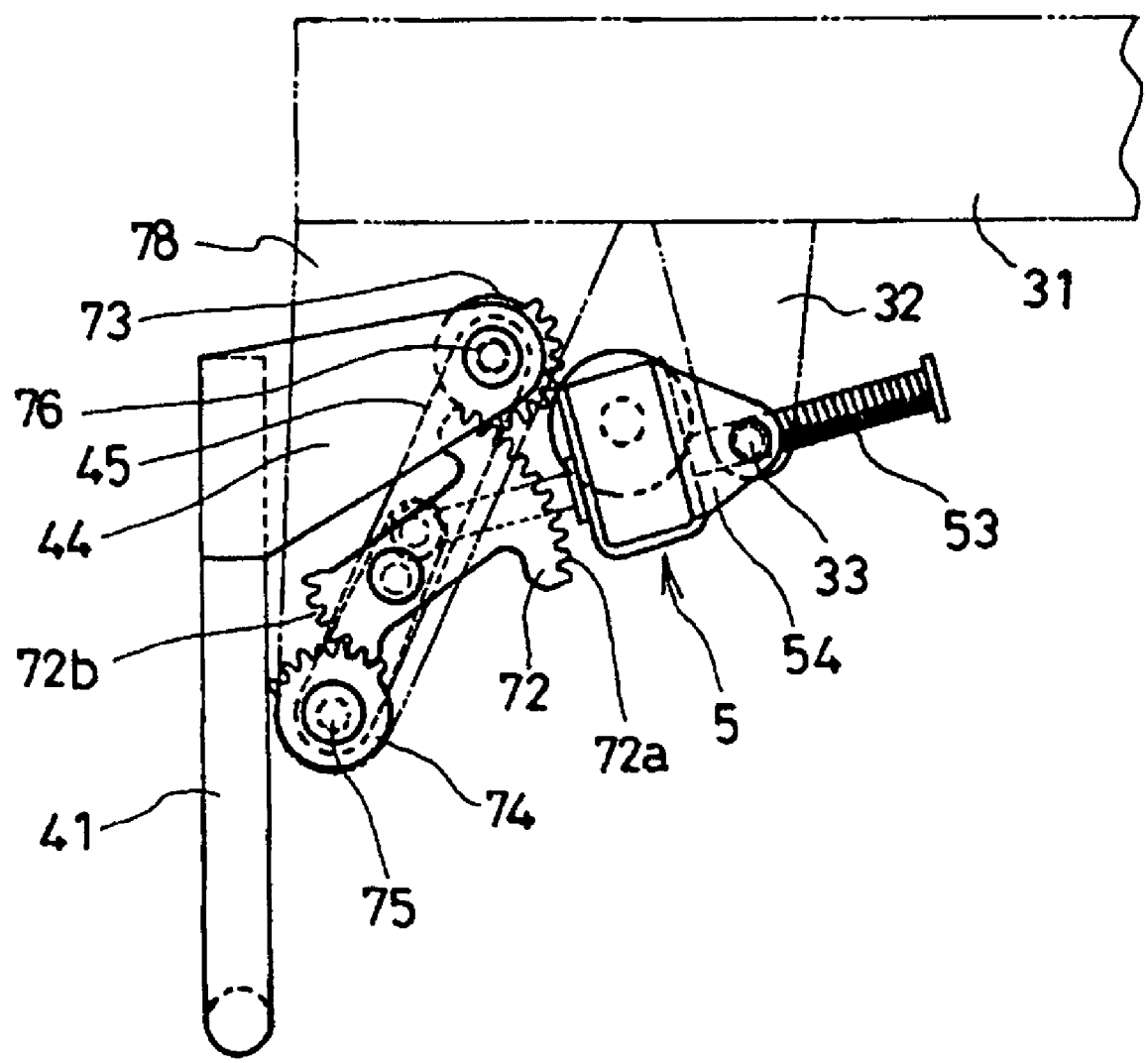
FIG. 2 illustrates a partial side view of the seat apparatus being folded state according to the first embodiment of the present invention.
Figure 3:
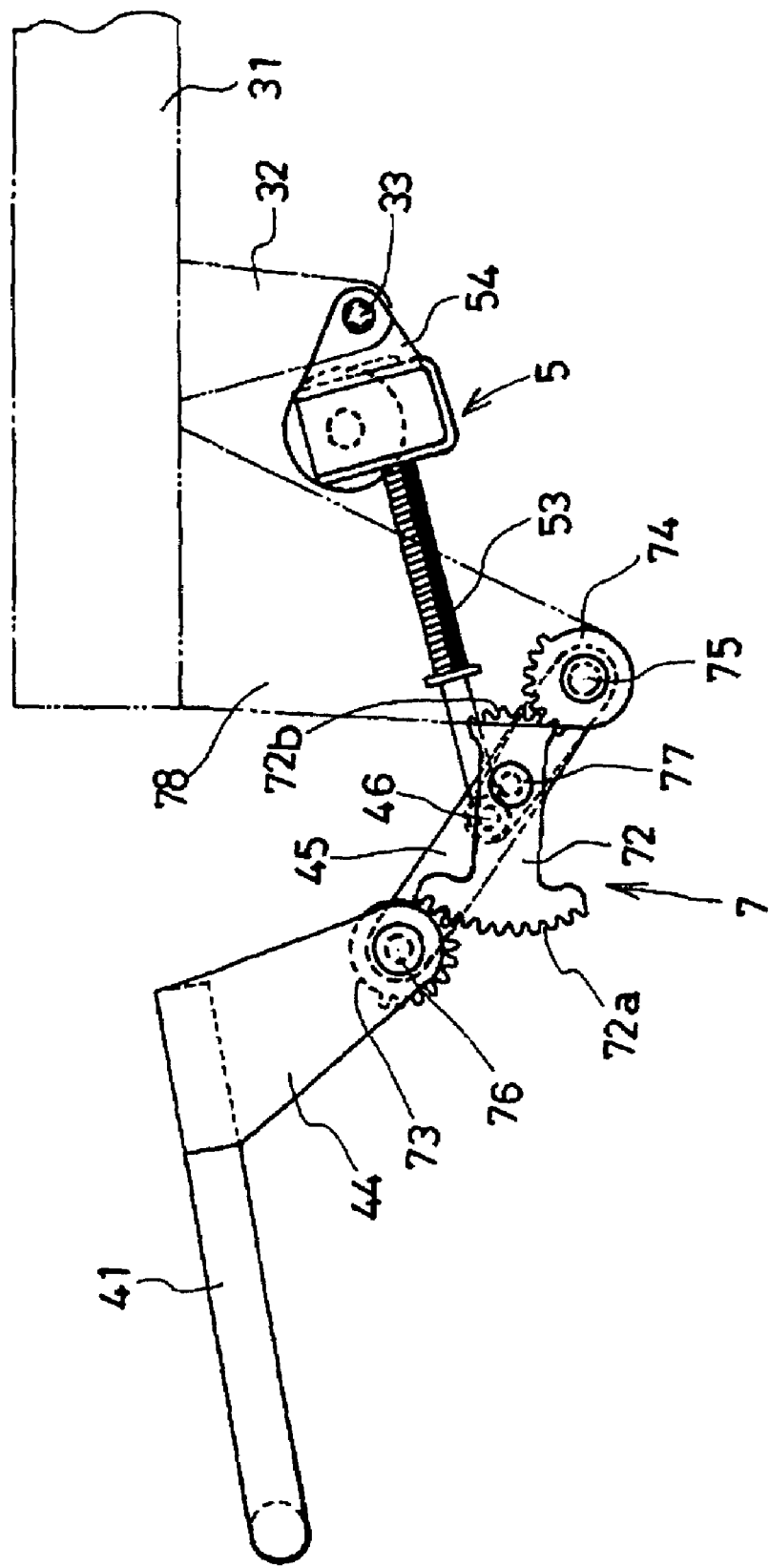
FIG. 3 illustrates a partial side view of the seat apparatus being unfolded state according to the first embodiment of the present invention.

As shown in FIGS. 1 through 3, a first gear 73 being meshing with the first partial gear 72a is fixed to the arm 44, wherein the center of the point of the first gear 73 corresponds to the center point of the rotation shaft 76, and a second gear 74 being meshing with the second partial gear 72b is fixed to the lower end of the bracket 78, wherein the center point of the second gear 74 corresponds to the center point of the rotation shaft 75.

One link member 45 is connected to the other link member 45 at the position where the rotation shafts 75 is provided with a rod 42 extending in the seat width direction so that both link members 45 can be integrally rotated. In FIG. 1, a lower end of a connecting arm 43 is connected to the center portion of the rod 42. Further, a top end of the connecting arm 43, extending upward, is connected to a driving rod 53 of a driving device 5 with a rotation pin 46.

The driving device 5 is rotatably supported at the bracket 32, fixed to the under surface of the cushion frame 31, with a pin 33 through a supporting bracket 54. The driving device 5 includes an electric motor 51 supported by the supporting bracket 54, a decelerating mechanism portion 52, a driving nut (not shown) housed in the decelerating mechanism portion 52 and rotated by an actuation from the electric motor 51, a screw 53a engaging with the driving nut and a driving rod 53 being moved in longitudinal direction of the seat by the rotation of the driving nut actuated by the electric motor 51.

An actuation of the seat apparatus 1 including the collapsible footrest 4 having the aforementioned configuration will be explained as follows.

Figure 4:
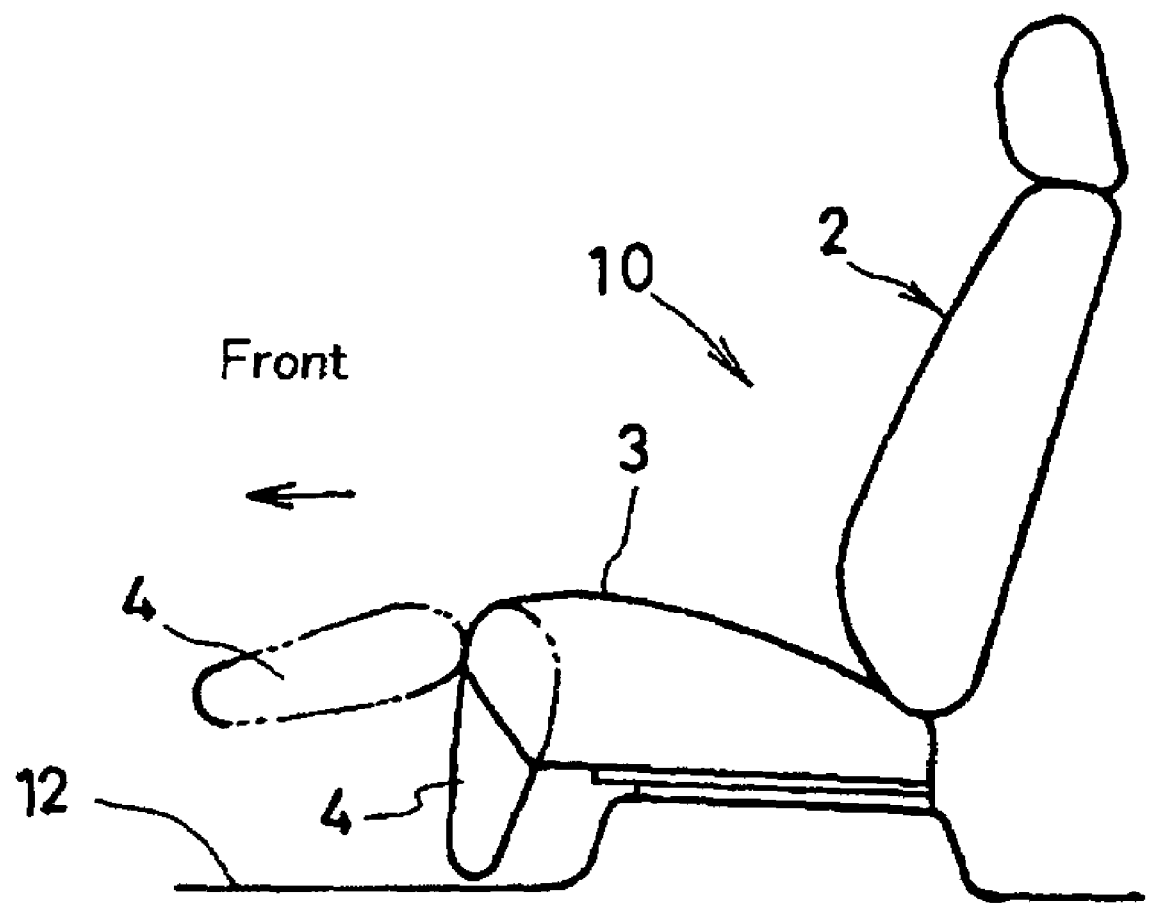
FIG. 4 illustrates a side view of the seat apparatus according to the first embodiment of the present invention.

FIG. 2 illustrates a condition of the link mechanism 7 when the footrest 4 shown in a solid line in FIG. 4 is folded. FIG. 3 illustrates a condition of the link mechanism 7 when the footrest 4 shown in a chain double-dashed line in FIG. 4 is unfolded.

When the footrest 4 shown in FIG. 2 is folded, the driving rod 53 becomes fully retracted state toward the rear direction of the seat as shown in FIG. 2. At this point, the link member 45 is fully rotated in clockwise direction relative to the rotation shaft 75. The footrest 4 being folded condition is unfolded as shown in FIG. 3 by energizing the electric motor 51 of the driving device 5 (shown in FIG. 1) so as to push the driving rod 53 out in front direction of the seat. According to the rotation of the link member 45, the second partial gear 72b of the transmitting gear 72 rotatably supported by the link member 45 meshes with the second gear 74 fixed to the bracket 78 so as to rotate in anticlockwise direction relative to the link member 45. The first partial gear 72a of the transmitting gear 72 rotatably supported by the link member 45 meshes with the first gear 73 fixed to the arm 44 so as to rotate in clockwise direction relative to the link member 45. Thus, the footrest 4 is unfolded as shown in the chain double-dashed line in FIG. 4. The unfolded footrest 4 is actuated to be folded again by reversing the rotation of the motor 51.

Figure 5:
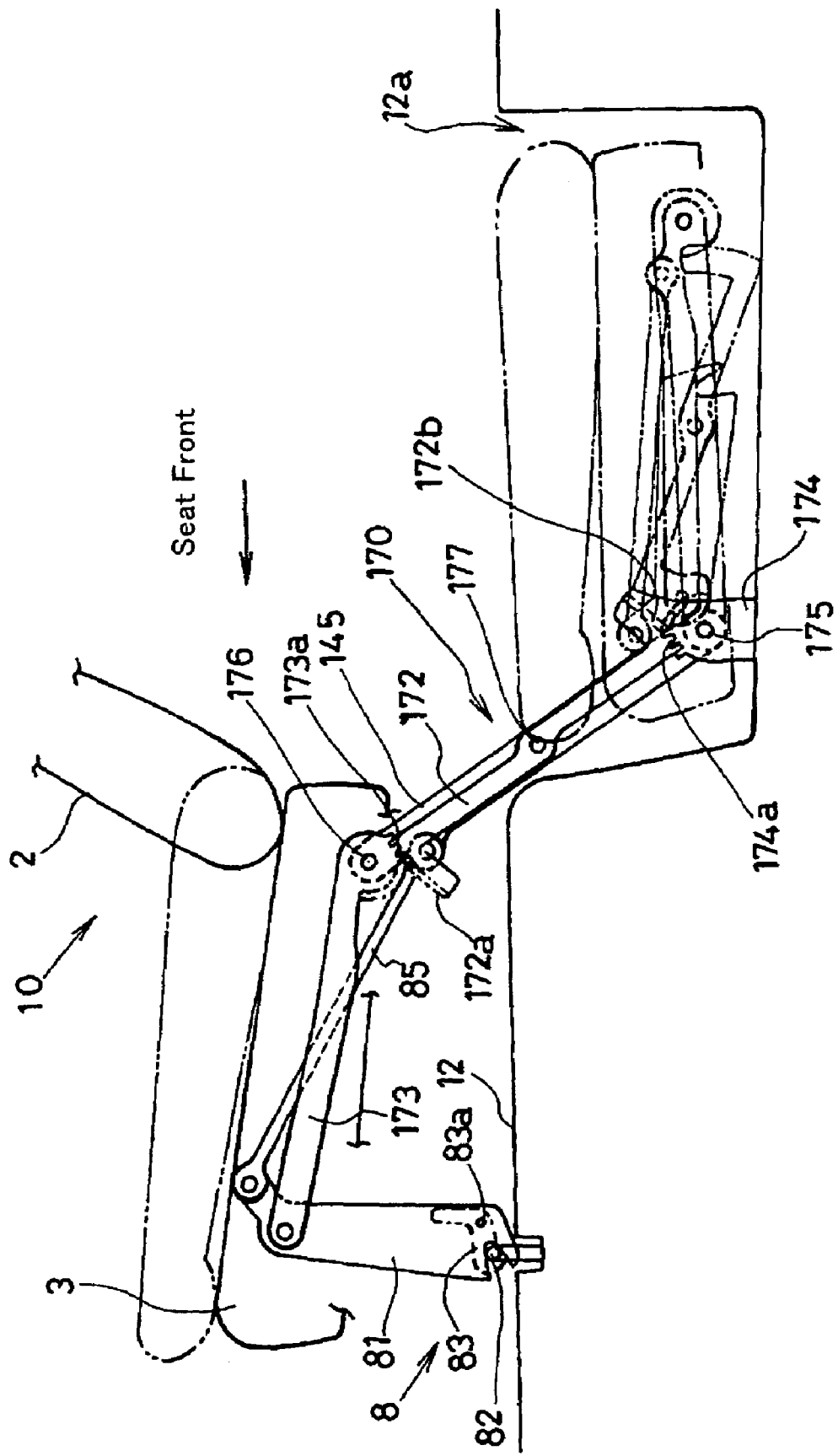
FIG. 5 illustrates a side view of the seat apparatus according to the second embodiment of the present invention.

Another example of the seat apparatus 10 being retractable as shown in FIG. 5 will be explained as a second embodiment of the present invention.

In the second embodiment, the state of the seat apparatus 10 can be changed from the seating state to the retractable folded state. The seat apparatus 10 is supported by a front leg portion and a rear leg portion 170 to be stand on a vehicle floor in the seating state, and the seat apparatus 10 is housed in a concave portion 12 provided under the floor 12 in the retractable folded state. Such seat apparatus 10 includes the gear and link mechanism described in the first embodiment, which is applied to the rear leg portion 170. Thus, the seat apparatus 10 becomes retractable.

Figure 6:
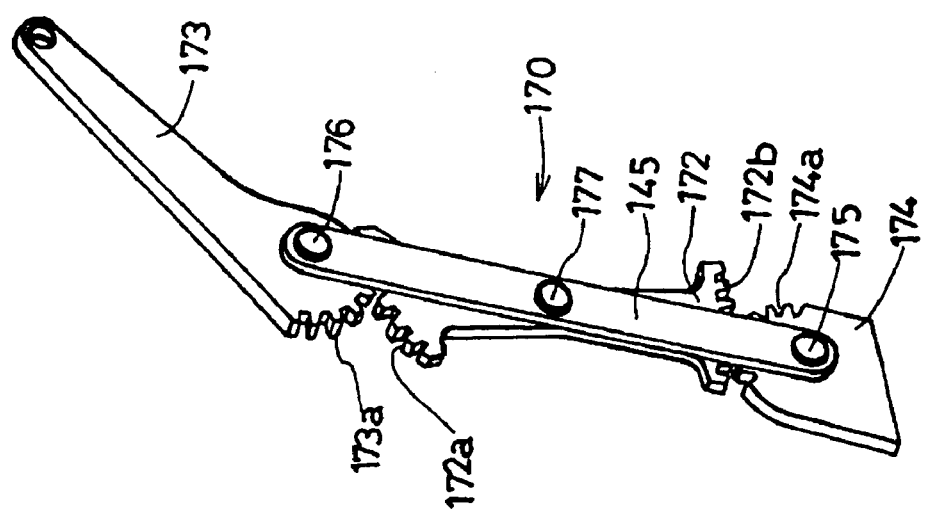
FIG. 6 illustrates a perspective view of a gear and link mechanism applied to the seat apparatus according to the second embodiment of the present invention.

FIG. 6 indicates the rear leg portion 170 including the gear and link mechanism. As shown in FIGS. 5 and 6, a second gear 174a is provided at a supporting bracket 174 of the rear leg portion 170 installed on the floor 12. A transmitting gear 172 is rotatably supported by a supporting post 145 of the rear leg portion 170 by a rotation shaft 177. The supporting post 145 is provided as a link member of the gear link mechanism. On the other hand, a first gear 173a is formed at the rear end portion of a frame 173 double as the cushion frame. The transmitting gear 172 includes a first partial gear 172a meshing with the first gear 173a and a second partial gear 172b meshing with the second gear 174a.

Further, the supporting post 145 is connected to the front leg portion 81 with a connecting rod 85. The front leg portion 81 hinge connected to the front end of the frame 173 is folded by the connecting rod 85 in conjunction with the retracting actuation of the seat apparatus 10. The front leg portion 81 includes a lock mechanism 8 at the lower end portion of the front leg portion 81 for securing the position of the seat apparatus 10 at the seating position. The lock mechanism 8 includes a striker 82 fixed on the floor 12 and a hook 83 rotatably supported at the front leg potion 81 by a shaft 83a so as to lock the seat apparatus 10 to the floor 12.

The seat apparatus 10 having the aforementioned configuration is housed in the concave portion as follows. First, the seat back 2 of the seat apparatus 1 is folded on the seat cushion 3 by operating an angle adjusting mechanism (not shown), then the lock mechanism 8 is unlocked by rotating the hook 83, finally the seat apparatus 10 is pushed backward and housed in the concave portion 12a. The position of the seat apparatus 10 is maintained at a predetermined position by the actuation of the gear and link mechanism of the rear leg portion 170, so that the retracting operation becomes very simple.

Figure 7:
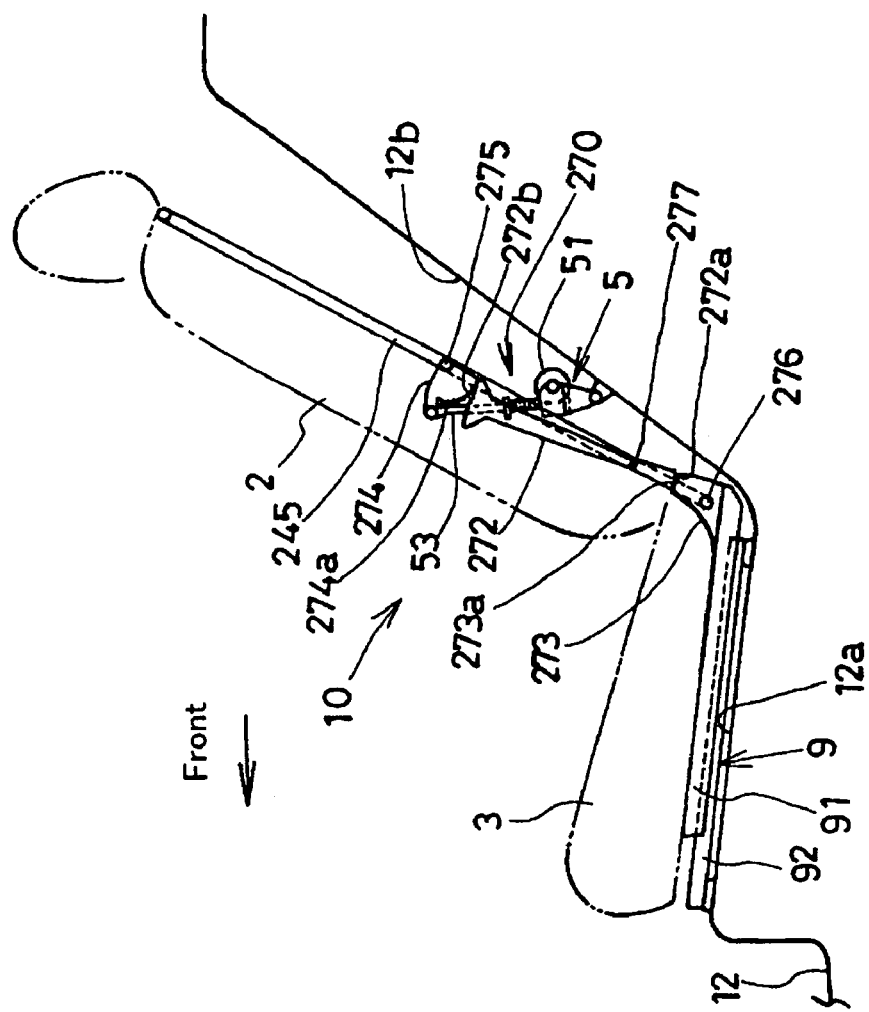
FIG. 7 illustrates a side view of the seat apparatus according to the third embodiment of the present invention.
Figure 8:
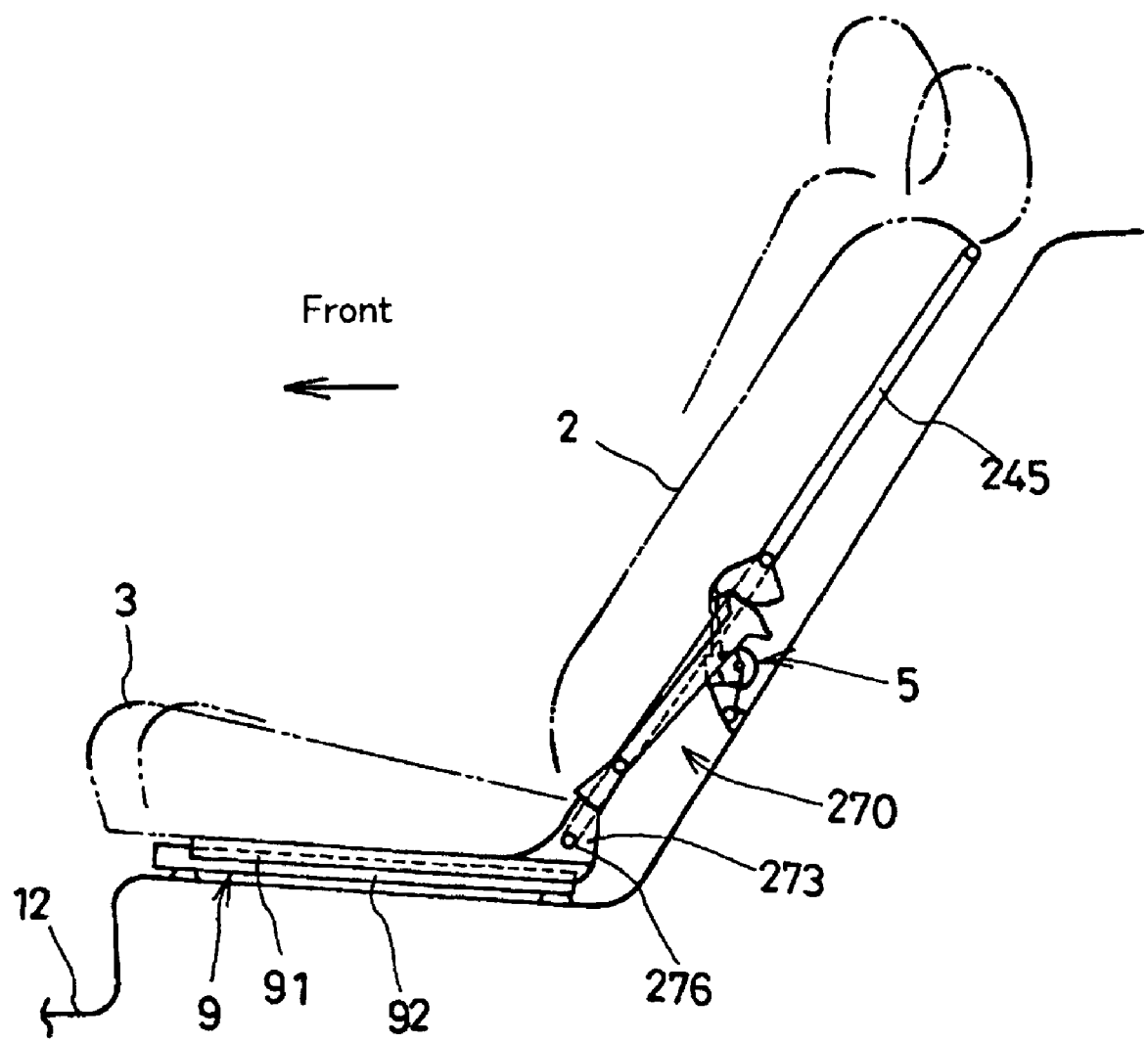
FIG. 8 illustrates a side view of the seat apparatus according to the third embodiment of the present invention after the position of the seat apparatus is adjusted.

Another configuration of the seat apparatus 10 according to the present invention will be explained as a third embodiment. In the third embodiment, the angle of the seat back 2 can be adjusted as shown in FIGS. 7 and 8.

Such seat apparatus 10 used as a rear seat of the vehicle includes the seat cushion 3 installed on a flat portion 12a of the vehicle floor 12, and the seat back 2 standing along a rear end surface 12b of the compartment and being rotatable about the supporting shaft 276 relative to the seat cushion 3 so as to adjust the angle of the seat back 2. The gear and link mechanism as explained in FIGS. 1 and 2 is applied to the angle adjusting mechanism 270 of the seat back 2.

The seat back 2 includes a frame 245 for securing the strength thereof. On the other band, the seat cushion 3 is supported to the floor 12 through a seat slide apparatus 9 attached on the flat portion 12a of the floor 12. The seat slide apparatus 9 is driven by a known driving apparatus (not shown) including an electric motor. The seat slide apparatus 9 includes an upper rail 91 and a lower rail 92, which are slidably engaging each other in longitudinal direction of the seat (in approximately horizontal direction in FIG. 7). Further, the upper rail 91 is fixed to the seat cushion 3, and the lower rail 9 is fixed to the flat portion 12a of the floor 12. A bracket 273 extending upward is fixed to the rear end portion of the upper rail 91, and the frame 245 as a link member of the gear and link mechanism is rotatably supported at the bracket 273 by the supporting shaft 276. The bracket 273 includes a first gear 273a at a rear end portion thereof. A transmitting gear 272 including a first partial gear 272a which is meshing with the first gear 273a is rotatably supported to the frame 245 by a rotation shaft 277. Further, a supporting member 274 is rotatably attached to the frame 245 by the rotation shaft 275. The supporting member 274 includes a second gear 274a meshing with a second partial gear 272b of the transmitting gear 272. On the other hand, the driving device 5 for rotating the supporting member 274 relative to the rotation shaft thereof is provided between the supporting member 274 and the rear end surface 12b of the compartment. As explained above, the driving device 5 includes the motor 51 and the driving rod 53, and once the motor 51 is energized, the driving rod 53 is reciprocated to rotate the second gear 274a.

The seat apparatus 10 including the angle adjusting mechanism 270 having the aforementioned configuration is actuated by a controlling device (not shown) in which the driving device 5 and a driving device (not shown) of the seat slide apparatus 9 are actuated by the instruction of the operator. Then the position of the seat apparatus 10 is changed from one position shown in a chain double-dashed line to the other position shown in another chain double dashed line shown in FIG. 8. At this point, the second gear 274a is rotated by the driving device 5 relative to the frame 245, the transmitting gear 272 is rotated, finally the frame 245 is rotated relative to the bracket 273 due to the meshing actuation between the first partial gear 272a and the first gear 273a. As a result, the position of the seat cushion can be adjusted by the seat slide apparatus 9, at the same time, the angle of the seat back 2 relative to the seat back 2 is determined based on the positions and the postures of the frame 245 and the upper rail 91.

The invention claimed is:

1. A seat apparatus for a vehicle including a supporting member, and a moving member whose position is adjustable relative to the supporting member, while a posture of the moving member is in a predetermined position, the seat apparatus comprising:
   a link member rotatably connected to the supporting member and the moving member respectively;
   a first gear secured to the moving member for moving the moving member;
   a second gear secured to the supporting member; and
   a transmitting gear rotatably supported to the link member and including a first partial gear meshing with the first gear and a second partial gear meshing with the second gear;
   wherein the transmitting gear is shaped in a link shape having one end and another end opposite to the one end relative to a rotational axis of the transmitting gear, the first partial gear being positioned on the one end of the transmitting gear, and the second partial gear being positioned on the other end of the transmitting gear; and
   wherein the first gear is positioned on a first rotational axis of the link member relative to the moving member, and the second gear is positioned on an second axis of the link member relative to the supporting member.

2. The seat apparatus according to claim 1, wherein the supporting member includes a bracket provided at a seat cushion, and the moving member includes an arm provided at a footrest.

3. A seat apparatus for a vehicle including a supporting member, and a moving member whose position is adjustable relative to the supporting member, while a posture of the moving member is in a predetermined position, the seat apparatus comprising:
   a link member rotatably connected to the supporting member and the moving member respectively;
   a first gear secured to the moving member for moving the moving member;
   a second gear secured to the supporting member; and
   a transmitting gear rotatably supported to the link member and including a first partial gear meshing with the first gear and a second partial gear meshing with the second gear;
   a driving device coupled with the link member for actuating a link mechanism;
   a supporting shaft provided on the moving member at a first axis line of the first gear and rotatably supporting to the link member; and
   a rotation shaft rotatably supported on the supporting member at a first axis line of the second gear and secured to the link member, a rod member connecting the driving device for transmitting a drive force to the link member.

4. The seat apparatus according to the claim 3, wherein the transmitting gear is shaped in a link shape having one end and another end opposite to the one end relative to a rotational axis of the transmitting gear, the first partial gear being positioned on the one end of the transmitting gear, and the second partial gear being positioned on the other end of the transmitting gear.

5. A seat apparatus for a vehicle including a supporting member and a moving member whose position is adjustable relative to the supporting member, while a posture of the moving member is in a predetermined posture, the seat apparatus comprising:
   a link member rotatably connected to the supporting member and the moving member respectively;
   a first gear secured to the moving member;
   a second gear secured to the supporting member; and
   a transmitting gear rotatably supported to the link member and including a first partial gear meshing with the first gear and a second partial gear meshing with the second gear;
   wherein the transmitting gear is shaped in a link shape having one end and another end opposite to the one end relative to a rotational axis of the transmitting gear, the first partial gear being positioned on the one end of the transmitting gear, and the second partial gear being positioned on the other end of the transmitting gear, and
   wherein the first gear is positioned on a first rotational axis of the link member relative to the moving member, and the second gear is positioned on a second axis of the link member relative to the supporting member.

6. The seat apparatus according to claim 5, further comprising:
   a driving device coupled with the link member for actuating a link mechanism;
   a supporting shaft provided on the moving member at a first axis line of the first gear and rotatably supporting to the link member; and
   a rotation shaft rotatably supported on the supporting member at a first axis line of the second gear and secured to the link member, a rod member connecting the driving device for transmitting a drive force to the link member.

* * * * *

UNITED STATES PATENT AND TRADEMARK OFFICE
CERTIFICATE OF CORRECTION

PATENT NO. : 7,229,134 B2 Page 1 of 1
APPLICATION NO. : 10/892324
DATED : June 12, 2007
INVENTOR(S) : Sadao Ito It is certified that error appears in the above-identified patent and that said Letters Patent is hereby corrected as shown below:

On the Title Page, Item 73, in the Assignee, line 1, "Kasiha," should read --Kaisha,--.

Signed and Sealed this

Twentieth Day of November, 2007

JON W. DUDAS
*Director of the United States Patent and Trademark Office*